United States Patent [19]

Uchiyama

[11] 3,809,508
[45] May 7, 1974

[54] PUMP
[75] Inventor: Ryoji Uchiyama, Ichikawa, Japan
[73] Assignee: Maruyama Mfg. Co., Ltd., Tokyo, Japan
[22] Filed: Dec. 6, 1971
[21] Appl. No.: 205,146

[52] U.S. Cl. ............................................. 417/511
[51] Int. Cl. ............................................ F04b 7/00
[58] Field of Search .......... 417/511, 512, 513, 511, 417/509; 92/168

[56] References Cited
UNITED STATES PATENTS

| | | | |
|---|---|---|---|
| 263,861 | 9/1882 | Conley | 417/547 |
| 3,233,554 | 2/1966 | Huber et al. | 417/262 |
| 2,605,021 | 7/1952 | Churchill | 417/511 |
| 3,548,721 | 12/1970 | Eisennegger | 92/168 X |
| 2,281,933 | 5/1942 | Gage | 417/554 |
| 2,931,313 | 4/1960 | Hughes | 417/511 |
| 3,238,889 | 3/1966 | Huber et al. | 92/168 X |
| 3,558,244 | 1/1971 | Uchiyama | 417/511 |
| 3,652,188 | 3/1972 | Uchiyama | 417/511 |

Primary Examiner—William L. Freeh
Assistant Examiner—Leonard Smith
Attorney, Agent, or Firm—H. Dale Palmatier

[57] ABSTRACT

A reciprocating pump with a reciprocable rod with a disc valve thereon, a tube loosely knotted on the rod to seat one end against the disc valve, a liquid pervious retainer for the tube on the rod and allowing movement of the tube away from the disc valve, and a stationary seal in the pump housing encompassing the tube in sealing relation and preventing longitudinal reciprocation of the tube within the seal.

2 Claims, 13 Drawing Figures

PUMP

BRIEF SUMMARY OF THE INVENTION

This invention relates to a liquid pump and particularly to a high pressure pump which is well adapted to create high pressures for moving small quantities of liquid.

A principal aspect of this invention is the use of a tube and valve at one end of the tube, both on a reciprocating rod and within a sealed housing to operate as a plunger pump. The seal separating the high and low pressure ends of the pump is stationary and is mounted on the pump housing in encompassing relation to the tube and in sealing relation with the exterior periphery thereof. The seal prevents migration of both liquid and air between the high and low pressure ends of the pump.

This construction has numerous advantages and provides great flexibility of operation to accommodate an extremely wide range of pumping conditions. The stationary seal guides the periphery of the tube and permits absolute self-centering of the tube in the seal. Without changing the tube, various kinds and sizes of seals may be substituted in accordance with the pressures and types of liquids being pumped. Lubrication between the seal and tube may be easily provided independently of the liquid being pumped by injecting a lubricant into or through the stationary seal to the inner annular face engaging the tube.

The tube may be readily and easily changed in the event of wear; and various tubes of differing sizes and materials may be interchanged to pump liquids under varying conditions. For instance, a stiff metal tube may be used with a relatively soft or yieldably plastic seal; or if a less stiff tube is desired with the same seal, the tube may be readily removed and replaced. It may be that the seal should be hard such as tungsten or carbide, and a tube of resiliently yieldable material which will cold flow may be utilized with such a hard seal under certain conditions. Of course, a full range of hard and soft materials may be successfully used in the tube and seal.

The reciprocating tube may be extremely light to minimize inertia and make possible high speed operation. Further, the tube or at least a portion of it may be constructed to expand or bulge slightly under high pressure influence to increase the sealing relation to the stationary seal.

The parts of this pump are extremely simple and readily manufacturable and replaceable. The tube need only have a suitable outside diameter according to the seal utilized. One end of the tube is shaped to form a valve seat against which the disc valve on the piston rod seats. The engagement between the tube and disc valve serves the additional function of retaining the tube in a redetermined orientation within the housing and thereby assuring that the tube slides readily through the seal without cocking or turning so as to minimize any possible wear. A liquid pervious disc or spider on the rod retains the tube adjacent the disc valve.

Because the annular seal is stationary with the housing, the spacing between the inner wall of the housing and the edge of the disc valve is not a limiting factor in the magnitude of flow of liquid which this pump will handle. The disc valve may be as large as necessary to seal against the end edge of the tube, and the housing may be spaced well outwardly therefrom. Although, in the drawings, the pump housing is illustrated to be generally cylindrical in shape, the housing may be variously shaped in order to obtain the necessary flow without interfering with the reciprocation of the tube and with the valving action between the end of the tube and the disc valve. For instance, the housing may flare outwardly from the seal so as to have a significantly larger size in the area of the disc valve.

DETAILED SUMMARY OF THE INVENTION

Figure 1:
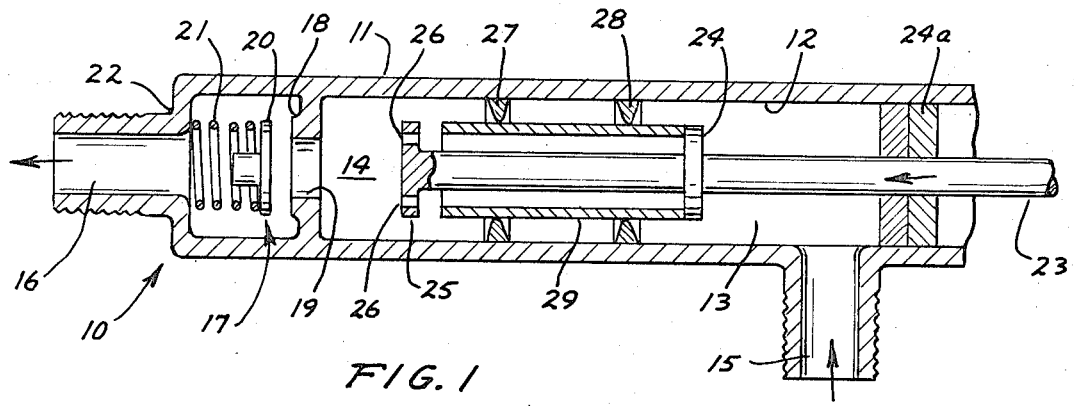
FIG. 1 is a longitudinal section view of a reciprocating pump diagrammatically illustrating the present invention during the forward or pressure stroke of the cycle.

A simplified and diagrammatic form of the invention is illustrated in FIG. 1. The pump is indicated in general by numeral 10 and includes a pump housing 11 having an interior periphery 12 which, in this illustration, is generally cylindrical in shape. The housing, together with other apparatus hereinafter described, defines a low pressure chamber 13 and a high pressure chamber 14. The housing 11 has a liquid inlet 15 communicating with the low pressure chamber 13 and a liquid outlet 16 communicating with the high pressure chamber 14. The inlet 15 is connectable with any suitable supply of liquid, and the outlet 16 is connected to any type equipment such as a nozzle through which the high pressure liquid is ultimately discharged and utilized. The outlet 16 incorporates a spring pressed check valve 17 including a transverse wall 18 within the housing with a flow port 19 therethrough and a valve element or disc 20 seatable against the wall 18 around the port 19 to restrict reverse flow through the port 19. The valve element 20 is normally urged against the seal of wall 18 by a coil spring 21 which is otherwise seated against the end wall 22 of the housing 11 adjacent the outlet 16.

The pump 10 also has a reciprocating rod 23 extending into the housing 11 and through the low pressure chamber 13 thereof. The rod 23 may be reciprocated by any suitable source of power, and is guided within the housing 11 by glands or packing 24a which also seal against the reciprocating rod 23 and prevent liquid flow along the rod from the chamber 13.

Rod 23 has an impervious disc valve 24 affixed thereon and in spaced relation with the end of the rod. The rod 23 also has a retainer or stopper disc 25 affixed thereon in confronting and widely spaced relation away from the disc valve 24. The retainer disc 25 may have any of a number of shapes, but in the form illustrated, the disc 25 is circular in configuration and has a plurality of apertures 26 spaced around the periphery thereof so as to be essentially non-restrictive to flow of liquid within the intended capacity of the pump.

The spacing between the disc valve 24 and the retainer disc 25 is greater than the length of the stroke of reciprocating rod 23; and in this particular construction of FIG. 1, the distance between the disc valve 24 and the retainer disc 25 is very considerably greater than the length of the reciprocating stroke because of the substantial effective length of the seal effected by sealing rings 27 and 28.

The sealing rings 27 and 28 are annular in shape and are affixed, mechanically or by adhesives, to the inner wall 12 of the housing 11. The seals 27 and 28 may be of any of a number of different materials, but may be made of slightly yieldable plastic or hard rubber.

A longitudinally reciprocable tube 29 is confined within the sealing rings 27 and 28 and bears against the sealing rings in sealing relation to separate the high pressure chamber 14 from the low pressure chamber 13. The tube 29 has a substantially cylindrical exterior periphery, and a length slightly less than the spacing between the disc valve 24 and the retainer disc 25 so that the ends of the tube 29 will alternately engage the disc valve 24 and the retainer disc 25.

The interior periphery of tube 29 is widely spaced from the rod 23 so as to provide an ample flow passage for movement of liquid through the tube, and to assure that the tube 29 is absolutely free of the rod 23 and able to move transversely of the rod without any interference whatever. As a result, the tube 29 is completely self-centering within the sealing rings 27 and 28 and is guided only by the sealing rings 27 and 28 during longitudinal reciprocation. The ends of the tube 29 are smooth and lie perpendicular to the axis of the tube 29 so as to lay flush against and seat against the disc valve 24 and the retainer disc 25 and prevent any tendency to cock or orient the tube obliquely with respect to the sealing rings 27 and 28.

In the form illustrated, the tube 29 is preferably constructed of stainless steel and is therefore stiff and resistive to the corrosive effects of liquids being pumped. It should be understood that the tube 29 may be otherwise constructed of other metals such as brass or aluminum, or various plastics such as vinyls or styrene, depending upon the use to which the pump is being put. The tube 29 will in most instances be relatively stiff, but may be yieldable and deformable at the sealing rings 27 and 28 if the tube is relatively soft or yieldable and the sealing rings are relatively hard. The tube 29 may be also formed of spring steel so as to closely conform to the shape of the sealing rings 27 and 28; and it may be desirable in certain instances to construct the tube 29 so that it will bulge slightly under influence of the high pressure liquid in chamber 14 outwardly against the sealing rings 27 and 28. The tube 29 may be formed in a single piece or may have a laminated construction with the outer periphery of the tube having a characteristic adapting it to be bulged or adapted to be yieldable in relation to the sealing rings 27 and 28.

The rod 23 may be reciprocated over a wide range of speeds, such as 500 to 1,200 cycles per minute. Liquid pressures at the outlet of the pump may be in the range of three to five thousand pounds per square inch, but may also be effectively and controllably increased as high as ten thousand pounds per square inch.

During operation of the pump 10, the reciprocation of the rod 23 causes reciprocation of the tube 29 in the seals 27 and 28. The pump is illustrated in FIG. 1 to be in the pressure or forward stroke wherein the disc valve 24 is seated against the end of tube 29 and liquid is being moved forwardly to maintain the check valve 17 in open condition and cause liquid to be discharged at the outlet 16. The forward stroke of the rod 23 will terminate before the disc valve 24 reaches the seal 28, whereupon, when the rod 23 reverses its direction, the disc valve 24 pulls away from the end of the tube 29 and the retainer disc 25 moves against the adjacent end of the tube to cause the tube to travel with the rod 23 in a reverse direction. As a result of the disc valve 24 moving away from the tube 29, the interior of the tube is open to the low pressure chamber 13, and flow of liquid through the tube 29 is also permitted to pass through the apertures 26 of the retainer disc 25. In this type of pump, the forward flow of liquid from the inlet 15 to the port 19 continues through the chambers 13 and 14 during the reverse stroke of the rod 23 with the disc valve 24 spaced from the tube 29. The reverse stroke of the rod 23 will terminate before the retainer disc 25 reaches the seal 27 and the rod 23 will reverse again so as to move forwardly in a pressure stroke. As the forward movement of the rod 23 commences again, the tube 29 is immediately closed at its rear end by the disc valve 24 and the retainer disc 25 is moved away from the tube 29. Forward movement of the tube 29 with the rod 23 and the discs moves the fluid through the outlet as previously described.

During the rapid reciprocation of the tube 29, the tube is free to move transversely with respect to the housing 11 or rod 23 and be guided solely by the seals 27 and 28. As a result, the wear of either the seals or the exterior of the tube is minimized.

Figure 2:
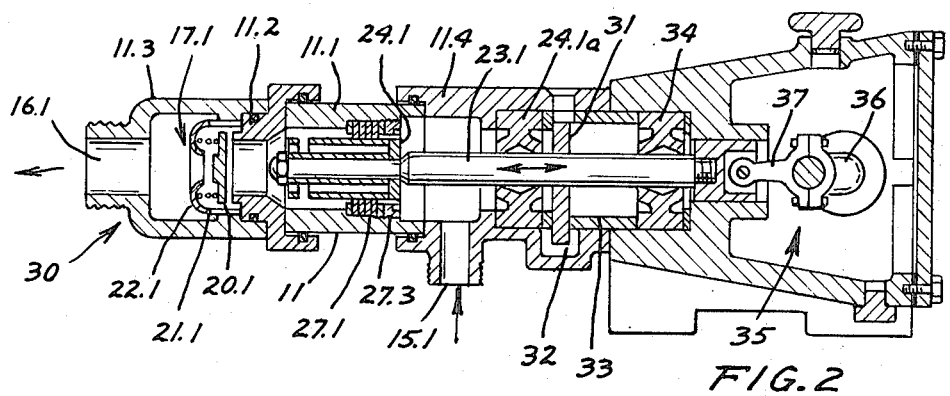
FIG. 2 is a longitudinal section view illustrating a typical pump construction embodying the present invention and illustrating the pump during the pressure or forward stroke of the reciprocating piston rod.
Figure 3:
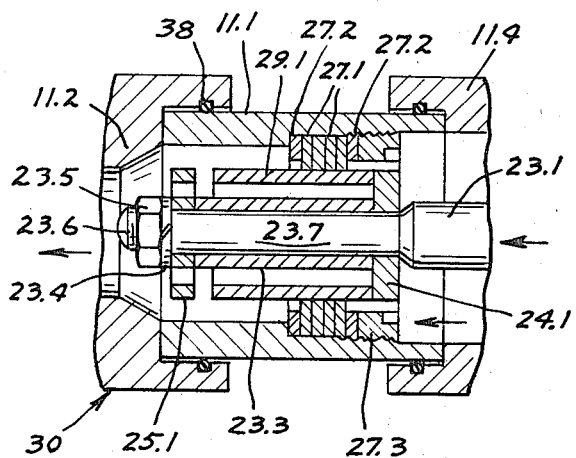
FIG. 3 is an enlarged detail section view illustrating a portion of the apparatus shown in FIG. 2.
Figure 4:
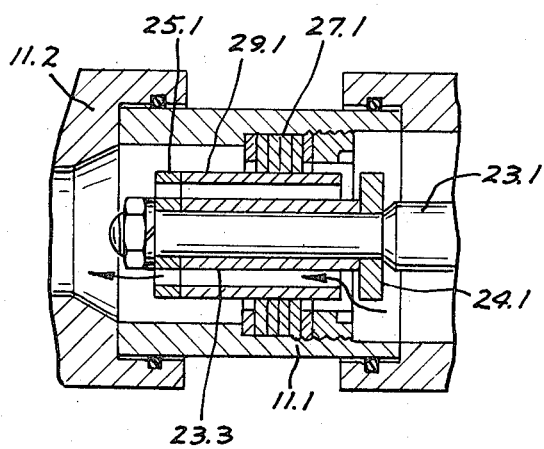
FIG. 4 is an enlarged detail section view similar to FIG. 3, but showing the mechanism in the reverse or return stroke of the cyle.

The pump 30 illustrated in FIGS. 2 – 4 illustrates the invention incorporated into an actual and in many respects a typical commercial pump. The housing 11' is divided into a number of sub-assemblies or parts including sleeve 11.1 which mounts the seals or packing rings or wafers 27.1; the valve seat ring 11.2, the outlet manifold 11.3 which confines the spring pressed check valve assembly 17.1; the inlet manifold 11.4 which mounts the seal packing 24.1a receiving the reciprocating rod 23. 1 therethrough. A rod lubricating wick 31 extends down into a sump 32 wherein a supply of lubricating fluid such as oil is maintained. The seal retainer 33 bears against the seal 24.1a and seal 34 which also encompass the reciprocating rod 23.1 and isolates the rod driving mechanism 35 to prevent contamination of the rod lubricant. The mechanism 35 includes a crank arm 36 rotatably driven as by a motor and connected by a piston rod 37 to the end of reciprocating rod 23.1.

The inlet port 15.1 is connected to any suitable source of liquid supply. The outlet port 16.1 discharges into a conduit system or multi-port manifold receiving the discharge from several such pumps 30. The outlet manifold 11.3 is threaded into such a receiving manifold so as to assure that the outlet manifold 11.3, valve seat ring 11.2, sleeve 11.1 and inlet manifold 11.4 are retained in assembly with each other. It will be noted that O-ring seals 38 are provided to assure sealing between the various components of the housing. The several components or portions of the housing are readily disassembled by simply pulling them apart when the outlet manifold 11.3 has been threadably detached from the receiving manifold of the conduit system. Of course, other suitable means such as clamps could be provided for retaining all of the housing components together to be readily removed from these housing components which are then permitted to slip apart for maintenance of the pump and changing of components.

The check valve assembly 17.1 includes the valve element 20.1 seatable against the valve seat 18.1 and pressed by coil spring 21.1. In this form, the spring is confined by a liquid pervious and apertured spring retainer 22.1.

As best seen in FIGS. 3 and 4, the reciprocating rod 23.1 has a reduced end portion 23.2 upon which the disc valve 24.1 is mounted. A retaining sleeve 23.3 fits tightly on the reduced end of the rod and bears against the disc valve 24.1 for retaining the disc valve stationary with respect to the rod. The retainer disc 25.1 is on the reduced end portion 23.2 of the rod and is retained thereon and against the sleeve 23.3 by a spring washer 23.4 and a nut 23.5 on the threaded tip end 23.6 of the rod.

In this form, the seal between the housing and the tube 29.1 is provided by a plurality of sealing rings or wafers 27.1 confined within the sleeve 11.1 of the housing between washers 27.2 and by means of a clamping or push ring 27.3 which is threaded along the interior periphery of the sleeve 11.1.

The tube 29.1 may be of any of a number of materials as hereinbefore specified and may be metal such as stainless steel or brass. The packing wafers or rings forming the seal 27.1 may be of any of a number of materials such as plastic, rubber or various hard or soft materials.

FIG. 3 illustrates the forward stroke of the rod and tube 29.1 and FIG. 4 illustrates the reverse or rearward stroke of the rod and tube. As previously indicated, liquid moves forwardly through the inlet 15.1 of the pump during both forward and reverse strokes of the rod and tube 29.1 and ordinarily, about 60 percent of the flow occurs during the forward movement of the rod and tube, and the remainder of the flow occurs during the rearward stroke of the rod and tube.

Figure 10:
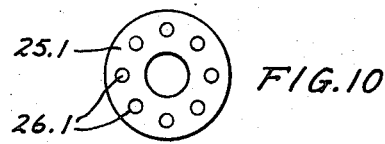
FIG. 10 is a detail elevation view of the retainer used on the reciprocating rod.

The retainer disc 25.1 is substantially in the form illustrated in FIG. 10 with the plurality of apertures 26.1 spaced about the periphery.

In the form of the invention illustrated in FIGS. 2 – 4, it is a simple matter to disassemble the housing 11' of the pump by simply removing the outlet manifold 11.3, after disconnecting the threaded attachment at the outlet end thereof, removing the valve seat ring 11.2 by merely slipping it off the sleeve 11.1, whereupon by removing the nut 23.5, the retainer disc 25.1 may be removed to facilitate replacing the tube 29.1 if necessary, or if a tube of different size or material is to be employed. Reassembly is obviously extremely simple. In the event that the packing 27.1 is to be replaced, the sleeve 11.1 will also be slipped off the inlet manifold 11.4 and the packing is readily and easily removed by unthreading the retainer ring 27.3 facilitating ready and easily removal of the sealing washers or discs 27.1. These may be replaced with similar discs or those of different material and the ring 27.3 replaced with only a minimum of tools and effort. There need be no realigning of parts during reassembly because the tube 29.1 is completely self-centering because it is free to move transversely with respect to the rod 23.1 as required in the packing 27.1.

Figure 5:
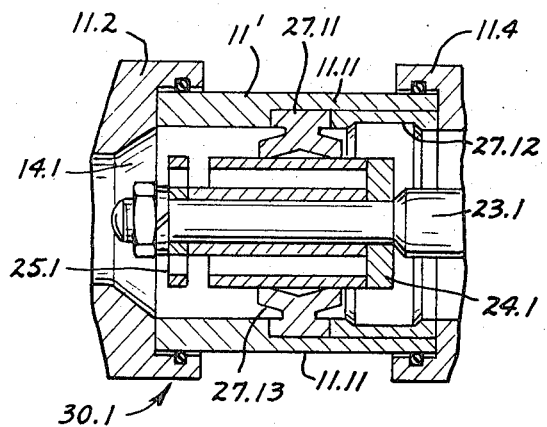
FIG. 5 is an enlarged detail section view similar to FIG. 3, and illustrating a modified construction.

The form of pump 30.1 illustrated in FIG. 5 is very similar to that shown in FIGS. 2 – 4 and utilizes a similar multiple part housing 11' which includes the same valve seat ring 11.2, inlet manifold 11.4, reciprocating rod 23.1, disc valve 24.1 on the rod, retainer disc 25.1, also affixed on the rod, and a reciprocating tube 29.1 confined between the disc valve 24.1 and the retainer disc 25.1 for alternate engagement therewith. In this form of the invention, the sleeve portion 11.11 of the housing which encloses the tube 29.1 and the end of the reciprocating rod 23.1, has a smooth surfaced inner bore which confines and mounts the sealing ring or seal packing 27.11 and a retainer sleeve 27.12 which bears against the end of the inlet manifold 11.4 and retains by clamping the sealing ring 27.11 in stationary position within the housing. In the form illustrated, the sealing ring 27.11 may be constructed of resiliently flexible or essentially stiff material, and in one form may be formed of hard rubber or relatively stiff resiliently yieldable plastic. The sealing ring 27.11 has a pair of broad sealing flanges 27.13 respectively extending in opposite directions, longitudinally of the tube 29.1 and bearing against the outer surface of the tube at conical faces to exert an inwardly directed sealing pressure against the tube, but permitting longitudinal sliding of the tube through the seal. This form of seal 27.1 may be readily formed by molding and provides an effective seal against leakage of high pressures developed in the high pressure chamber 14.1 of the pump.

In this form of the invention illustrated in FIG. 5, the pump housing is readily disassembleable as is the form illustrated in FIGS. 2 – 4. The tube 29.1 may be readily and easily replaced as may the sealing ring 27.11.

Figure 6:
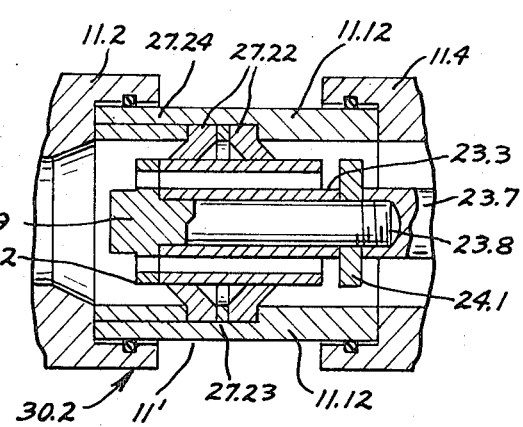
FIG. 6 is an enlarged detail section view similar to FIG. 3 and illustrating a second modification.

The form of the pump 30.2 illustrated in FIG. 6 is similar to the pump illustrated in FIGS. 2 – 4 and has a multi-part housing 11' with the same type of inlet manifold 11.4 and valve seat ring 11.2. In this form of the invention, the sleeve portion 11.12 of the housing has a smmoth bored interior with a shoulder or ledge to confine a pair of substantially identical sealing rings 27.22 separated by an annular spacer 27.23. The sealing rings 27.22 are confined within the sleeve 11.12 by a retaining ring 27.24 which bears against the end of the valve seal ring 11.2.

The sealing rings 27.22 may be constructed of suitable material to produce an effective pressure seal at the exterior surface of the tube 29.1, and may be formed of relatively hard or soft materials, depending upon the pressures and pumping conditions. A typical material may be hard rubber or a resiliently yieldable plastic. The sealing rings 27.22 have oppositely oriented conical portions extending inwardly to bear against the exterior periphery of the tube 29.1 and the conical portions of the sealing rings respectively extend toward the opposite ends of the tube 29.1.

It will also be noted that the pump 30.2 has a modified form of rod 23.7 terminating and bearing against the disc valve 24.1. The rod 23.7 has a threaded bore 23.8 into which the threaded end of a rod extension 23.9 is threaded. The rod extension 23.9 has a retainer disc 25.1 formed integrally thereof to bear against the end of the tube 29.1 as in the other forms of the pump. The spacer sleeve 23.3 bears against and extends between the retainer disc 25.2 and the disc valve 24.1 to assure the maintenance of the proper spacing therebetween so as to permit limited movement of the tube 29.1 therebetween.

Figure 7:
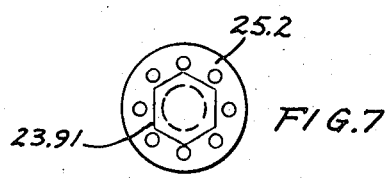
FIG. 7 is a detail elevation view of the perforate tube retainer employed in the mechanism of FIG. 6.

In the form of the pump 30.2 illustrated in FIG. 6, the housing 11.1 is readily and easily disassembled for removal and replacement of both the sealing rings 27.22 and the reciprocating tube 29.1. The integrally formed rod extension 23.9 and retainer disc 25.2 is illustrated in FIG. 7 and it will be noted that a hexagonal cap end 23.91 is formed to facilitate tightening and loosening the rod extension in the threaded bore 23.8.

Figure 8:
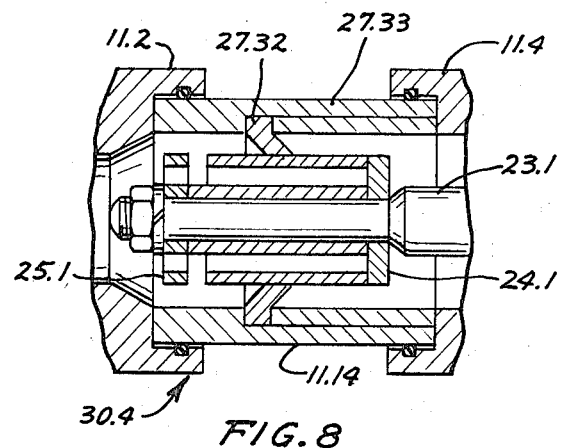
FIG. 8 is an enlarged detail section view similar to FIG. 3 and showing a further modification of the construction.

In the form of pump 30.3 illustrated in FIG. 8, a single retainer ring 27.32 of conical shape is clamped against the shoulder of the smooth bored housing sleeve 11.14 by retainer ring 27.33 which is confined within the housing sleeve by the end of the inlet manifold 11.4. This sealing ring 27.32 may be formed of hard rubber or resiliently yieldable plastic, or any other suitable soft or hard material to effect a high pressure seal to the tube 29.1 but permit longitudinal reciprocation of the tube therethrough.

Figure 11:
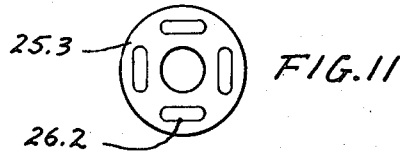
FIGS. 11, 12 and 13 are detail elevation views showing other forms of retaining discs and spiders.
Figure 12:
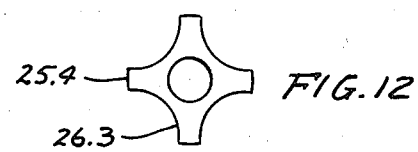
Figure 13:
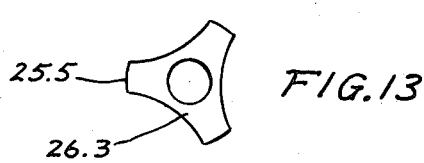
Figure 9:
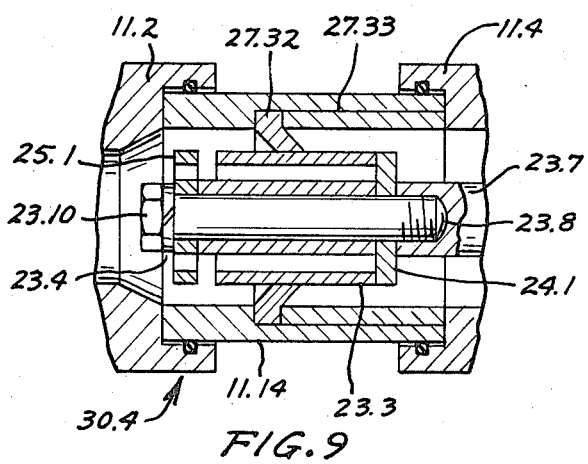
FIG. 9 is an enlarged detail section view similar to FIG. 3 and illustrating still another modification of the invention.

The form of pump 30.4 illustrated in FIG. 9 is similar to the pump illustrated in FIG. 8 and has the same form of housing sleeve 11.14, sealing ring 27.32 and retaining ring 27.33. In this form of pump 30.4, the reciprocating rod 23.7 is similar to that of FIG. 6 and the end of the rod 23.7 bears against the disc valve 24.1. The threaded bore 23.8 of the rod receives the threaded end of a hexagonally headed rod 23.10 which also mounts the spacer sleeve 23.3 and the retainer disc 25.1 as well as the spring washer 23.4. Although the retainer disc 25.1 with the apertures spaced around the periphery thereof, have been found adequate for many purposes, other forms of retainer discs are illustrated in FIGS. 11, 12 and 13. The retainer disc 25.3 in FIG. 11 is provided with elongate slots 26.2 to increase the flow area through the disc. The retainer discs 25.4 and 25.5 illustrated in FIGS. 12 and 13 assume a somewhat spider shape with large recesses 26.3 providing the open area for liquid flow through the disc.

It will be seen that I have provided a new and improved reciprocating pump wherein the pump housing confines the reciprocating rod which carries a disc valve and a retaining disc in spaced and confronting relation to each other and wherein a tube is mounted on the reciprocating rod between the disc valve and retaining disc for alternate engagement therewith to be reciprocated; and the interior of the housing is provided with a seal bearing against and sealing to the exterior periphery of the tube which is allowed to longitudinally move through the seal and self-center itself within the seal for producing an effective high pressure pumping action. The tube and seal are all readily and easily removed and replaced and may be formed of a variety of hard and soft materials in order to accommodate the particular pumping conditions.

In forms of the pump wherein the seal engages against tube over a significant portion of the length of the tube, or wherein the seal incorporates two distinct sealing surfaces spaced along the length of the tube, as in FIGS. 1, 5 and 6. There may be a significant wearing of the tube periphery at the seal closest to the high pressure chamber, over a period of time. In this event, the tube may be simply reversed, end for end, to renew the pumping mechanism and extend the effective life thereof. As a result, considerable cost savings will be effected, particularly in situations wherein the tubes are made of special ceramic type materials or special purpose alloys or precious metals.

What is claimed is:

1. A reciprocating high pressure pump comprising:
    a pump housing having a low pressure inlet port, and a high pressure discharge port with a check valve therein, said ports being respectively disposed adjacent opposite ends of the housing;
    a reciprocable rod extending into the housing and having a rigid disc valve and a rigid perforate retainer disc fixed thereon in confronting relationship to each other and spaced from each other by a predetermined distance, the disc valve and retainer disc being oriented perpendicular to the rod and being widely spaced from the interior periphery of the housing,
    the housing also having a stationary yieldable annular seal encompassing the rod and in widely spaced relation with the rod; and
    a reciprocable, self-centering tube within the housing and spaced from the interior periphery thereof, said tube being slidably confined within the seal in sealing relation and the tube having smooth ends perpendicular to its axis, the seal-engaging periphery of the tube and the seal being exposed to the liquid in both ends of the housing for lubricating effect, the tube encompassing the rod in widely spaced relation therewith to permit liquid flow through the tube, said tube being axially but not transversely confined between the disc valve and retainer disc and having a length less than said predetermined distance for free axial movement of the tube with respect to the reciprocating rod between the disc valve and the retainer disc, and to alternately lie flush against and seat against said disc valve and retainer disc as the rod is reciprocated, whereby cocking of the tube in the annular seal in response to limited transverse relocation of the tube with respect to the disc valve and retainer disc is prevented and whereby high pressure flow of liquid adjacent the discharge port is afforded.

2. A high speed, high pressure reciprocating pump for liquid to produce discharge pressures of 3 to 5,000 pounds per square inch at 500 to 1,200 cycles per minute, comprising:
    an elongate, multiple part, demountable pump housing having a high pressure discharge port with a check valve therein and also having a low pressure inlet port, said ports being disposed adjacent opposite ends of the housing;
    a reciprocable rod extending into the housing through one end thereof;
    the housing also having a yieldable annular seal protruding inwardly from the interior periphery of the housing and encompassing the rod and in widely spaced relation with the rod; and an elongate, light weight, low inertia tube for high speed reciprocation, the tube having smooth inlet and outlet ends perpendicular to its axis, and a rigid disc valve mounted on the rod and oriented perpendicular of the rod and confronting the perpendicular inlet end of the tube to seat flushly thereagainst, the tube being slidably confined within the seal in sealing relation therewith for longitudinal sliding reciprocation through the seal and in spaced relation with the housing so that substantially the entire exterior periphery of the tube is wetted by the liquid in the housing as the tube reciprocates to provide lubrication, the disc valve being spaced from the inner housing periphery but having a diameter substantially in excess of the interior diameter of the tube to overlap the end of the wall of the tube and thereby produce valving action while permitting limited transverse relocation of the tube within the seal in accordance with the shape of the seal as the tube is reciprocated and to minimize wear of the seal and tube, and the rod having a readily removable rigid perforate retainer mounted thereon perpendicular of the rod and adjacent the perpendicular outlet end of the tube and contactable therewith, and the removable retainer and the disc valve being spaced apart a predetermined distance to permit limited longitudinal relative movement of the tube therebetween to alternately permit and restrict liquid flow through the tube as the rod is reciprocated, a spacer on the rod and contacting the retainer and disc valve to maintain the predetermined distance therebetween, said removable retainer being substantially non-restrictive to movement of the tube transversely of the rod to minimize localized friction and wear between the tube and seal as the tube is reciprocated and to prevent cocking of the tube within the seal in response to transverse movement of the tube with respect to the valve and retainer, said housing being adapted for ready disassembly adjacent its discharge port for ready and easy removal of the reciprocable tube axially of the housing.

* * * * *